United States Patent [19]

McLean

[11] 4,153,547
[45] May 8, 1979

[54] USE OF ACIDIFIED COPPER SULFATE IN HYDROGEN SULFIDE REMOVAL

[76] Inventor: John O. McLean, Box 288-A, Rte. 14, Richmond, Va. 23231

[21] Appl. No.: 875,635

[22] Filed: Feb. 6, 1978

[51] Int. Cl.² .............................................. C02B 1/10
[52] U.S. Cl. ...................................... 210/48; 210/51; 55/73
[58] Field of Search .................... 210/48, 50, 51, 52, 210/53, 60, 59, 63 R, 80, 82, 143; 55/73

[56] References Cited

U.S. PATENT DOCUMENTS

| | | | |
|---|---|---|---|
| 1,997,114 | 4/1935 | Martin | 210/53 |
| 2,091,201 | 8/1937 | Hahn | 210/52 |
| 3,142,638 | 7/1964 | Blaisdell | 210/53 |
| 3,171,802 | 3/1965 | Rice | 210/53 |
| 3,186,942 | 6/1965 | Benger | 210/63 R |
| 3,350,259 | 10/1967 | Herrick | 210/51 |
| 3,491,086 | 1/1970 | Harvey | 210/53 |
| 3,649,532 | 3/1972 | McLean | 210/50 |
| 3,833,464 | 9/1974 | Rolfe | 210/51 |
| 4,049,545 | 9/1977 | Horvath | 210/53 |

FOREIGN PATENT DOCUMENTS

| | | | |
|---|---|---|---|
| 50-57956 | 5/1975 | Japan | 210/51 |
| 50-72867 | 6/1975 | Japan | 210/51 |
| 50-30937 | 10/1975 | Japan | 210/51 |

*Primary Examiner*—Charles N. Hart
*Assistant Examiner*—Ernest G. Therkorn
*Attorney, Agent, or Firm*—Richard P. Matthews

[57] ABSTRACT

A method of treating well water for purposes of desulfurizing the well water and making it palatable. The water is treated with an excess of acidified copper sulfate or other metal salt and delivered into the top of a treating tank which contains a neutralizing filter means. Copper sulfide is precipitated from the water and removed in the filter tank whereby sulfur-free neutral water is obtained. Any excess copper sulfate is precipitated as copper hydroxide and also removed in the filter. Periodically, the filter tank automatically backwashes itself to remove the copper residues or the filter may be manually backwashed if desired.

6 Claims, 1 Drawing Figure

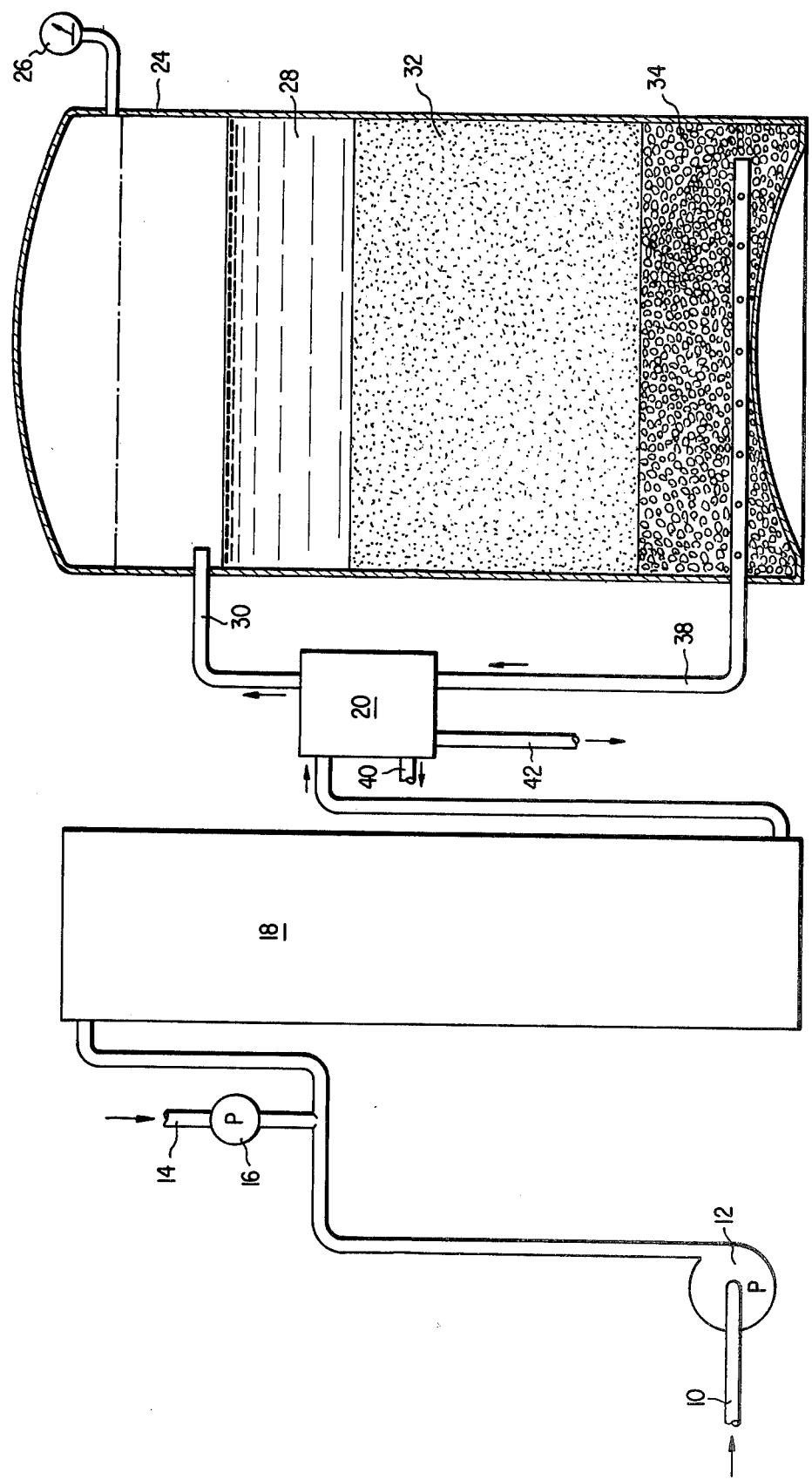

USE OF ACIDIFIED COPPER SULFATE IN HYDROGEN SULFIDE REMOVAL

This invention relates to a method of treating well water and, more particularly, to a method of treating well water for purposes of desulfurizing it and making it palatable.

A great many well waters are unpalatable because of the existence of sulfur odors and it is well recognized that it would be desirable to eliminate sulfur from well waters. In previous systems for making well water potable such as in U.S. Pat. No. 3,649,532 issued Mar. 14, 1972, to the patentee of the present invention, a system is described for removing iron from well waters. This system is also effective in removing odors from well waters. While some diminution of obnoxious odors caused by the presence of sulfur is made by use of the aforementioned system and in various modifications thereof, the effluent frequently shows a low sulfur content which is undesirable and objectionable.

If the system of the present invention is provided with a source of air and an excess air release as is illustrated in U.S. Pat. No. 3,649,532, it can be used to remove iron. However, if a source of air is not provided, the system of the present invention will remove the sulfur but not necessarily all of the iron.

In a preferred embodiment of the present invention, sulfur-containing well water is made palatable by introducing at least a slight excess of acidified copper sulfate into the water and delivering it to a treating tank. The latter contains a treating filter consisting of a neutralizing mineral with the acidified copper sulfate and well water being introduced atop the mineral. Copper sulfide is precipitated from the well water above the mineral which acts to neutralize water and functions as a mechanical filter.

In addition to copper sulfide, copper hydroxide is formed from the acidified copper sulfate and it, too, is mechanically filtered by the mineral. Thus, potable water is delivered to and removed from the bottom of the treating tank. The treating system is preferably backwashed periodically to remove copper residues from the treating tank.

The copper sulfate is preferably acidified so as to keep it in solution and to produce a non-gelatinous precipitate. This may be effected by the addition of small amounts of sulfuric acid to the copper sulfate solution. In a nonacid medium, copper hydroxide tends to precipitate as a gelatinous solid which will clog the filter prematurely.

After the copper sulfate has been added to the well water, the combined liquids may be aspirated into the treating tank atop the mineral provided that a system similar to that illustrated in U.S. Pat. No. 3,649,532 is used for iron removal. Alternatively, the combined liquids may be introduced into a pressure tank of a type frequently employed in domestic water supplies and then into the treating filter.

The inherent advantages and improvements of the present invention will become more readily apparent upon consideration of the following detailed description of the invention and by reference to the drawing in which The sole FIGURE is a schematic representation of a water treating system illustrating my invention.

Referring now to FIG. 1 of the drawings, there is illustrated a water supply source from a well or the like through pipes 10 which leads to a pump 12. Water thus received at its source is pumped by pump 12 into a pressure tank 18 but is mixed prior thereto with a slight excess of copper sulfate. In order to effect this, an input line is illustrated at 14 having a small chemical feed pump 16 for selectively controlling an amount of copper sulfate to be introduced to the original well water. After being introduced into pressure tank 18, the water and copper sulfate are introduced to an automatic control valve 20 in accordance with the demands of the user. This effluent 28 consisting of the original supply water from the well and copper sulfate is introduced into a large tank 24 through outlet pipe 30. As shown in the drawing, the effluent is deposited atop a filter consisting of a neutralizing mineral 32 positioned immediately above large gravel illustrated at 34. The treated water is received in a pipe loaded within the large gravel 34 selectively drawn off at the option of the user of the premises through an outlet 40 customarily to a house. A line is shown at 38 leading back to the automatic control valve 20. Periodically, it is desired to backwash the system and to that end a drain is supplied at 42 whereby backwashing may be effected automatically or initiated at will.

It is believed that the invention will be more readily understood by reference to the following examples which preceded and led to the present invention.

EXAMPLE 1

A suitable site was selected for experimentation in Jacksonville, Fla., using a deep strata (500–1,000 feet) of "sulfur water". A standard iron removal system was set up in Jacksonville in a manner illustrated in my aforementioned U.S. Pat. No. 3,649,532. At equilibrium conditions, although the air release was rank with hydrogen sulfide, the effluent water still had a trace of sulfur odor. Silver nitrate showed "high" sulfur in the raw water and "low" sulfur in the effluent, but the experiment was considered to be a failure.

EXAMPLE 2

The next experiment was carried out in Dundee, Mich. Here the raw water was so bad that the entire house was pervaded by odor so strong that it caused headaches. The water showed "high" sulfur with silver nitrate and had an alkaline pH of 7.5. Initial experiments were run using the standard iron removal unit illustrated in U.S. Pat. No. 3,649,532, but feeding in hydrochloric acid to achieve a pH of 5.5. Removing sulfur odors from acid waters is known to be easier than from alkaline waters. At equilibrium, with a large excess of air, even though the air released smelled like pure hydrogen sulfide, the effluent water still showed "low" sulfur with siver nitrate, and had some odor and also an off-taste. This experiment was also considered to be a failure.

EXAMPLE 3

A chemical feed pump was set up to feed acidified copper sulfate solution into the raw water. When an excess of about one-half parts per million of copper was used (water at the top of the tank), the effluent water was crystal clear, had no odor or taste and showed substantially no copper. The water in the tank top was brown with precipitated copper sulfide, but this was removed by the mechanical filtering action of the neutralizing mineral, namely, limestone. On backwash, the backwash water was black. This experiment was considered to be a success.

EXAMPLE 4

Final experiments were made once again at Jacksonville, Fla., on the "sulfur water" using the same setup as in Example 2. The system was operated for a half day using copper sulfate feed and showed complete elimination of taste and odor at flow rates of four to five gallons per square feet per minute which is a practical flow rate. It appears that the rate limiting factor is in the filtration of the precipitated copper sulfide. Also, it was shown that even with four parts per million excess copper in the water in the tank top, the effluent never showed more than 0.1–0.2 parts per million, a very low value for copper.

From the foregoing, it is concluded that the system is safe in that should excess copper be accidentally forced into the raw water, the neutralizing mineral removes it. This has been confirmed time and again in laboratory tests. Removal of the excess copper is expected in that acid waters are neutralized by limestone. As soon as the water is neutral, copper hydroxide precipitates and is mechanically removed.

A number of different neutralizing minerals may be used in practicing the present invention. For example, where rapid neutralization is desired, a combination of limestone and magnesium oxide has been found to be especially beneficial. Other suitable neutralizing minerals used singly or mixed with others include limestone, dolomite, magnesite, magnesium oxide, some silicates, or the like. To act as an efficient filter, the mineral should conform roughly to the following sieve size:

25% retained on No. 30 U.S. standard sieve
38% retained on No. 40 U.S. standard sieve
20% retained on No. 50 U.S. standard sieve In addition to copper sulfate, soluble sulfates or chlorides of other metals having insoluble sulfides may be used such as iron, cobalt, nickel, zinc, etc., or double salts thereof such as ferric ammonium alum.

While a presently preferred embodiment of the invention has been illustrated and described, it will be recognized that the invention may be otherwise variously embodied and practiced within the scope of the claims which follow.

What is claimed is:

1. A method of treating well water for purposes of removing hydrogen sulfide from said well water comprising the steps of
    (a) conducting sulfur-containing water from a well,
    (b) acidifying a treating solution of copper sulfate to a maximum pH of 4 to prevent premature precipitation of copper hydroxide and introducing at least a slight excess of said acidified copper sulfate into said water,
    (c) delivering said water and acidified copper sulfate in a non-aerated system into a treating tank atop a treating filter of neutralizing mineral,
    (d) forming copper sulfide and precipitating same from said water,
    (e) forming copper hydroxide in said tank above or within said neutralizing mineral from the excess of said acidified copper sulfate,
    (f) mechanically filtering said copper sulfide and said copper hydroxide with said neutralizing mineral,
    (g) and removing sulfur-free water from the bottom of said treating tank.

2. A method of treating well water as defined in claim 1 wherein the step of introducing a slight excess of acidified copper sulfate into said well water includes the step of adding a small amount of sulfuric acid to said copper sulfate treating solution to give a maximum pH of 4.

3. A method of treating well water as defined in claim 1 including the step of periodically backwashing said neutralizing mineral to remove copper residues from said treating tank.

4. A method of treating well water as defined in claim 1 including the use of a pressure tank between the introduction of said acidified copper sulfate and said treating tank as a temporary storage tank.

5. A method of treating well water as defined in claim 1 including using a neutralizing mineral consisting of limestone.

6. A method of treating well water as defined in claim 1 including using a neutralizing mineral consisting of a mixture of limestone and magnesium oxide.

* * * * *